United States Patent [19]

Armer

[11] Patent Number: 4,685,079
[45] Date of Patent: Aug. 4, 1987

[54] RIPPLE-BORROW BINARY SUBTRACTION CIRCUIT

[75] Inventor: John Armer, Middlesex, N.J.

[73] Assignee: RCA Corporation, Princeton, N.J.

[21] Appl. No.: 682,014

[22] Filed: Dec. 14, 1984

[51] Int. Cl.⁴ .................................................. G05F 7/50
[52] U.S. Cl. ..................................... 364/784; 364/786
[58] Field of Search ............... 364/784, 785, 786, 787, 364/788

[56] References Cited

U.S. PATENT DOCUMENTS

| | | | |
|---|---|---|---|
| 3,767,906 | 10/1973 | Pryor | 364/786 X |
| 4,052,604 | 10/1977 | Maitland et al. | 364/786 |
| 4,152,775 | 5/1979 | Schwartz | 364/786 |
| 4,357,675 | 11/1982 | Freyman | 364/786 |
| 4,425,623 | 1/1984 | Russell | 364/786 |
| 4,439,835 | 3/1984 | Best et al. | 364/786 |
| 4,471,454 | 9/1984 | Deardend et al. | 364/786 |
| 4,523,292 | 6/1985 | Armer | 364/786 |
| 4,601,007 | 7/1986 | Uya et al. | 364/784 |

Primary Examiner—Archie E. Williams, Jr.
Assistant Examiner—Long T. Nguyen
Attorney, Agent, or Firm—E. M. Whitacre; P. J. Rasmussen; E. P. Herrmann

[57] ABSTRACT

A binary subtracter stage for subtracting single bit binary numbers includes a first exclusive OR gate to which the numbers to be subtracted are applied. The output of the exclusive OR gate is connected to one input of a second exclusive OR gate which has a second input connected to a borrow input signal. The output of the second exclusive OR gate provides the difference between the single bit binary numbers. A borrow output signal is generated with the combination of a pass transistor coupled between the borrow input and borrow output terminals and a three state logic circuit which has its output termial connected to the borrow output terminal. The pass transistor is controlled by the output of the first exclusive OR gate and the three state logic circuit is controlled by the single bit binary numbers to be subtracted.

6 Claims, 3 Drawing Figures

RIPPLE-BORROW BINARY SUBTRACTION CIRCUIT

The present invention relates to a binary subtracter stage for use in a dedicated binary subtraction circuit.

Binary subtracters are typically realized with binary adder circuits. The minuend is applied to one input port of the binary adder. The subtrahend is complemented and applied to the second input port of the binary adder. The sum output of the adder is the difference between the minuend and subtrahend. The disadvantages of this arrangement are (a) the extra circuitry necessary to complement the subtrahends, and (b) the complementing function increases the time required to perform a subtraction. A dedicated subtraction circuit may eliminate both of these limitations.

The design of a binary subtracter circuit requires considerations similar to those for binary adder circuits. For example, when subtracting two N-bit binary numbers, time must be provided for the "borrow" indication to propogate from the least significant bit position to the most significant bit position. Secondly, to maximize production yield and thereby to reduce production costs, at least when the circuit is realized in integrated circuit form, a minimum of circuit elements is desired.

Both of these goals are achieved in the design of a relatively fast dedicated binary subtracter stage employing a ripple-borrow generating technique in conjunction with binary subtraction circuitry. Ripple-borrow generation is an adaptation of ripple-carry generation used in binary adders. An example of ripple-carry generation may be found in U.S. Pat. No. 4,357,675 entitled "Ripple-Carry Generating Circuit With Carry Regeneration".

SUMMARY OF THE INVENTION

The present invention is a dedicated single-bit subtracter stage for subtracting a binary number Y from a binary number X with provision for applying a borrow, Bin, from a lesser significant subtracter stage against the minuend X and generating a borrow output signal Bout. The subtracter stage includes combinatorial logic for exclusive ORing the input numbers X, Y and Bin, the result of which corresponds to the difference of X minus Y including a borrow input.

The borrow output signal, Bout, is produced at a borrow out terminal to which is connected the output terminal of a three state circuit. The numbers X and Y are applied to the three state circuit which develops a logic one output state when Y is greater than X, a logic zero output state when X is greater than Y and a high impedance output state for X equal to Y. In addition, circuitry responsive to the numbers X and Y selectively applies the Bin signal to the borrow out terminal for X equal to Y.

DETAILED DESCRIPTION

Figure 1:
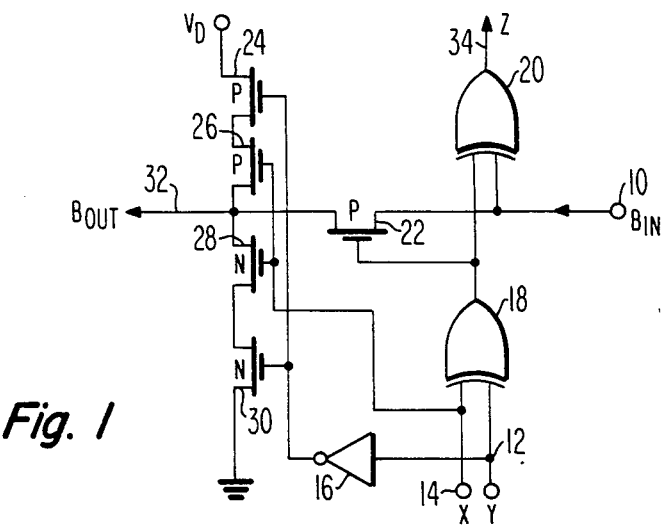
FIGS. 1 and 3 are part logic, part schematic diagrams of alternate single bit subtraction circuits embodying the present invention.

FIG. 1 is a single bit subtracter stage for determining the difference between two one-bit binary numbers X and Y. The stage includes a "borrow" input terminal 20 for cascade connection to a subtracter stage of lesser bit significance, and a borrow output terminal 32 for cascade connection to a subtracter stage of greater bit significance.

Binary numbers have only two values, "1" and "0". Therefore, the difference between two binary numbers can only be 1 or 0. Table I illustrates the binary arithmetic difference values for all combinations of X-Y.

TABLE I

| X − Y | DIFFERENCE |
|---|---|
| 1 − 1 | 0 |
| 1 − 0 | 1 |
| 0 − 1 | 1 |
| 0 − 0 | 0 |

It will be recognized that the correspondence shown in Table I is identical to a state table for an XOR gate having the values X and Y applied to its input terminals.

In FIG. 1 the single bit binary numbers X and Y to be subtracted are applied to terminals 14 and 12 respectively. These numbers are coupled to exclusive OR (XOR) gate 18. The output from XOR gate 18 is the difference of X minus Y (without accommodation for a borrow from the next lesser significant digit).

The output of XOR gate 18 is applied to one input terminal of a second XOR gate 20. The borrow input from e.g. a lesser significant bit subtracter stage is applied to the second input terminal of XOR gate 20. The output terminal 34 of XOR gate 20 produces the difference Z of X minus Y including a borrow from the next lesser significant digit.

With respect to XOR gate 20, if the borrow input is a zero, XOR gate 20 passes the differences produced by XOR gate 18 unchanged. Alternatively if the borrow input is a one, XOR gate 20 complements the differences produced by XOR gate 18. Arithmetically, the output of XOR gate 20 corresponds to X reduced by the borrow input minus Y. Table II shows all of the possible combinations of the values of X, Y and the borrow input, Bin.

TABLE II

| X | Y | Bin | X-Bin | Bout$_1$ | X-Bin-Y | Bout$_2$ | X⊕Y | (X⊕Y)⊕Bin |
|---|---|---|---|---|---|---|---|---|
| 0 | 0 | 0 | 0 | 0 | 0 | 0 | 0 | 0 |
| 1 | 0 | 0 | 1 | 0 | 1 | 0 | 1 | 1 |
| 0 | 1 | 0 | 0 | 0 | 1 | 1 | 1 | 1 |
| 1 | 1 | 0 | 1 | 0 | 0 | 0 | 0 | 0 |
| 0 | 0 | 1 | 1 | 1 | 1 | 0 | 0 | 1 |
| 1 | 0 | 1 | 0 | 0 | 0 | 0 | 1 | 0 |
| 0 | 1 | 1 | 1 | 1 | 0 | 0 | 1 | 0 |
| 1 | 1 | 1 | 0 | 0 | 1 | 1 | 0 | 1 |

The first, second and third columns of Table II are the values of X, Y and Bin. The column labelled (X-Bin) contains the values of X reduced by the borrow input.

The column labelled (Bout$_1$) corresponds to borrow output states resulting from the operation X-Bin. The column labelled (X-Bin-Y) contains the values which result from arithmetically subtracting Y from the values of X reduced by the Bin values. The column labelled (Bout$_2$) lists the borrow output values resulting from the operation (X-Bin-Y). The column labelled (X⊕Y) contains the values output by XOR gate 18 corresponding to the logical function X⊕Y where the symbol ⊕ designates the exclusive OR function. Finally, the column labelled ((X⊕Y)⊕Bin) contains the output values from XOR gate 20 corresponding to the exclusive ORing of (X⊕Y) and Bin.

It is seen that the values in the rightmost column labelled (X⊕Y)⊕Bin) resulting from the exclusive ORing of X, Y and Bin, are equal to the arithmetic differences shown in the column labelled (X-Bin-Y). Thus, the combination of XOR gates 18 and 20 produce the differences Z=X-Y including a borrow input.

The remainder of the FIG. 1 circuitry generates the borrow out values. The borrow output must be a one whenever either the Bout$_1$ or Bout$_2$ values in Table II are one. A little reflection will convince the reader that a borrow output "one" value should occur whenever the borrow input is greater than X, the subtrahend, Y, is greater than the minuend, X, or Y is equal to X and there is a borrow input. These conditions are all satisfied by the combination of Bout$_1$ and Bout$_2$ values.

In FIG. 1, the borrow output terminal 32 is coupled to the borrow input terminal 10 by a p-type enhancement mode transistor 22. Transistor 22 couples terminal 32 to terminal 10 when a zero level potential is applied to its gate or control electrode. XOR gate 18 controls transistor 22, and conditions it to pass the value Bin to terminal 32 whenever the input numbers X and Y have the same value, corresponding to the zero values in the column labelled (X⊕Y) of Table II. This occurs in rows 1, 4, 5 and 8 of the table. Note in row 5 a Bin value of one is coupled to terminal 32 to satisfy the one value in row 5 of column Bout$_1$ and a Bin value of one is coupled to terminal 32 to satisfy the one value in row 8 of column Bout$_2$. In rows 1 and 4 transistor 22 couples a borrow in zero to terminal 32 satisfying the Bout$_1$ and Bout$_2$ zero values. Note further that transistor 22 is never "on" when the borrow out is a one and the borrow in is a zero.

The series connection of transistors 24 and 26 between terminal 32 and positive supply potential V$_D$, and transistors 28 and 30 between terminal 32 and ground develop the remaining borrow output signals. Transistors 24 and 26 are both p-type devices and transistors 28 and 30 are both n-type devices. Complementary transistors 26 and 28, having their gate electrodes coupled together, operate in a complementary mode so that there is never a conducting path between positive supply V$_D$ and ground potential.

A one is coupled to terminal 32 from supply potential V$_D$ whenever transistors 24 and 26 are concurrently "on" or conducting. Transistor 26 has its gate connected to X input terminal 14 and conducts when X is a zero value. Transistor 24 has its gate coupled to Y input terminal 12 through inverter 16 and conducts when Y is a one value. Thus, transistors 24 and 26 conduct concurrently only in response to the logical AND of $\overline{X}Y$. This occurs for the X and Y values in rows 3 and 7 of Table II. A one borrow out value is required for both of these rows. It is seen that the pass transistor 22 is turned off for the X, Y states of rows 3 and 7.

A zero is coupled to terminal 32 from ground potential whenever transistors 28 and 30 are both conducting. Transistor 28 has its gate electrode coupled to the X input terminal 14 and conducts when X is a one value. Transistor 30 has its gate electrode coupled to the Y input terminal 12 through inverter 16 and conducts when Y is a zero value. Thus, transistors 28 and 30 conduct concurrently only in response to the logical AND function $X\overline{Y}$. This occurs for the X, Y states of rows 2 and 6 of Table II. In both rows a zero borrow out value is required. Again it will be noted that when transistors 28 and 30 are conducting, pass transistor 22 is in the non-conducting state.

In brief, transistors 24-30 and inverter 16 form a three state logic circuit which outputs a logic one for X=0, Y=1, a logic zero for X=1, Y=0 and exhibits a high output impedance otherwise. When the three state circuit is in the high impedance state, XOR gate 18 conditions pass transistor 22 to couple the borrow input signal at terminal 10 to the borrow output terminal 32.

Figure 2:
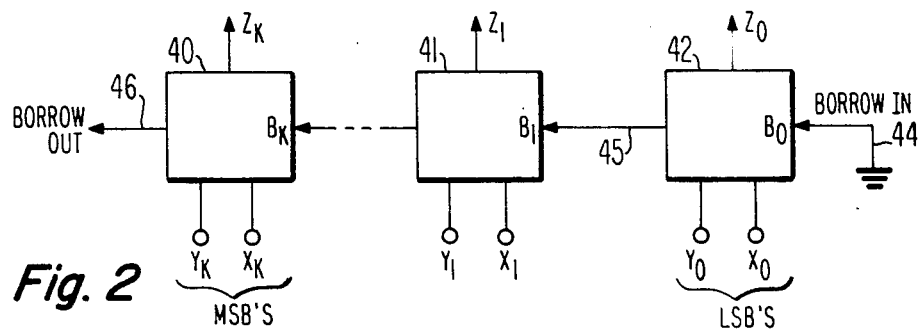
FIG. 2 is a block diagram showing the interconnection of a plurality of the FIG. 1 circuits to form a K+1 bit binary subtraction circuit.

FIG. 2 shows the interconnection of a plurality of FIG. 1 subtracter stages for subtracting one K+1 bit binary number Y from another K+1 bit binary number X. The least significant bits (LSB's) X$_o$ and Y$_o$ of the two binary numbers X and Y are applied to the rightmost subtracter stage 42 and the most significant bits X$_k$ and Y$_k$ are applied to the leftmost stage 40. The borrow input terminal 44 of stage 42 is coupled to a logic zero potential, and the borrow output terminal 46 produces an indication of polarity of the difference of X minus Y.

The borrow output terminal 45 of subtracter stage 42 is coupled to the borrow input terminal of subtracter stage 41, to which the next least significant bits X$_1$ and Y$_1$ of the binary numbers X and Y are coupled. K+1 stages are interconnected in this manner. The output terminals Z$_k$ to Z$_o$ of stages 40-42 provide the binary output (x-y) with Z$_k$ and Z$_o$ being the MSB and LSB of the difference respectively.

Figure 3:
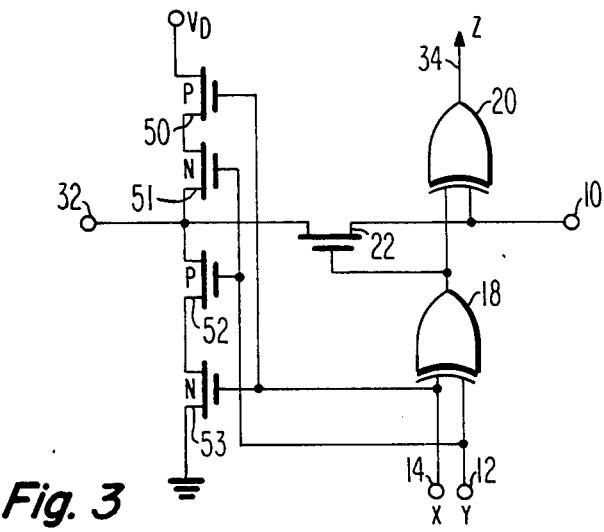

FIG. 3 illustrates a subtractor stage with an alternate three state borrow generating logic circuit. In this embodiment, a p-type transistor 50 and an n-type transistor 51 are coupled between positive supply and the borrow out terminal 32. A p-type transistor 52 and an n-type transistor 53 are serially connected between the borrow out terminal 32 and ground potential. The gates of transistors 50 and 53 are connected to input terminal 14. Transistor 50 conducts when X is a zero value and transistor 53 conducts when X is a one value. The gates of transistors 51 and 52 are connected to input terminal 12. Transistor 51 conducts when Y is a one value and transistor 52 conducts when Y is a zero value. Transistors 50 and 51 conduct concurrently for X equal to zero and Y equal to one. Thus a logic one is applied to terminal 32 by transistors 50 and 51 for the combination of X, Y values defined logically by $\overline{X}Y$. Transistors 52 and 53 conduct concurrently and apply a logic zero to terminal 32 for the combination of logic values defined by $X\overline{Y}$.

The FIG. 3 three state circuit performs the same logic function as the FIG. 1 three state circuit. However, the FIG. 3 circuit does not require an inverter circuit to control two of the serially connected transistors resulting in a subtracter stage with fewer devices.

What is claimed is:
1. A binary subtracter stage for subtracting a first single bit binary number Y from a second single bit binary number X, comprising:

first and second binary input terminals for applying binary numbers X and Y respectively;

a borrow input and a borrow output terminal;

a first XOR gate having first and second input terminals coupled to said first and second binary input terminals respectively, and having an output terminal;

a second XOR gate having first and second input terminals coupled respectively to said borrow input terminal and the output terminal of said first XOR gate, and having an output terminal for producing an output signal corresponding to the difference of X minus Y;

a pass transistor having a primary conduction path coupled between said borrow input and borrow output terminals, and having a control electrode coupled to the output terminal of said first XOR gate; and a three state logic circuit having first and second input terminals coupled to said first and second binary input terminals and an output terminal coupled to said borrow output terminal, said three state logic circuit generating a first logic output level according to the logic function $\overline{X}Y$, a second logic output level according to the logic function $X\overline{Y}$ and a high impedance output state otherwise, where the terms $\overline{X}$ and $\overline{Y}$ connote the logic complement of the binary values of X and Y respectively.

2. The subtracter stage set forth in claim 1 wherein the three state logic circuit comprises:

first and second transistors of a first conductivity type having primary conduction paths serially coupled between said borrow output terminal and a point of potential corresponding to said first logic level, and having respective control electrodes;

third and fourth transistors of a second conductivity type complementary to said first type, having primary conduction paths serially coupled between said borrow output terminal and a point of potential corresponding to said second logic level, and having respective control electrodes;

means for connecting the control electrode of said first and fourth transistors to said first binary input terminal;

an inverter circuit having an input terminal connected to said second binary input terminal and an output terminal connected to the control electrodes of said second and third transistors.

3. The subtraction circuit set forth in claim 1 wherein the three state logic circuit comprises:

first and second transistors of first and second complementary types respectively, having principal conduction paths serially coupled between said borrow output terminal and a point of potential corresponding to said first logic level, and having respective control electrodes connected to said first and second binary input terminals respectively;

third and fourth transistors of said first and second complementary types respectively, having principal conduction paths serially coupled between said borrow output terminal and a point of potential corresponding to said second logic level, and having respective control electrodes coupled to the second and first binary input terminals respectively.

4. A binary subtracter stage for subtracting a first single bit binary number Y from a second single bit binary number X comprising:

first and second binary input terminals for applying binary numbers X and Y respectively;

a borrow output terminal;

a borrow input terminal for applying a borrow input signal Bin;

exclusive OR circuitry having input terminals coupled to said first and second binary input terminals and said borrow input terminal, for producing a signal corresponding to the difference values X-Y at an output terminal thereof, responsive to the logic function $(X\oplus Y\oplus Bin)$;

means coupled to said first and second binary input terminals for selectively coupling the borrow output terminal to the borrow input terminal when the numbers X and Y are equal; and a three state logic circuit having first and second input terminals coupled to said first and second binary input terminals, and having an output terminal connected to said borrow output terminal, said three state logic circuit generating a logic one output state for the value of Y greater than X, generating a logic zero output state for the value of X greater than Y and generating a high impedance output state for the value of X equal to the value of Y.

5. The subtraction circuit set forth in claim 4 wherein the three state logic circuit comprises:

first and second transistors of first and second complementary types respectively, having principal conduction paths serially coupled between said borrow output terminal and a point of potential corresponding substantially to said logic one output state, and having respective control electrodes connected to said first and second binary input terminals respectively;

third and fourth transistors of said first and second complementary types respectively, having principal conduction paths serially coupled between said borrow output terminal and a point of potential corresponding substantially to said logic zero output state, and having respective control electrodes coupled to the second and first binary input terminals respectively.

6. The subtracter stage set forth in claim 4 wherein the three state logic circuit comprises:

first and second transistors of first conductivity type having primry conduction paths serially coupled between said borrow output terminal and a point of potential corresponding to said logic one output state, and having respective control electrodes;

third and fourth transistors of a second conductivity type complementary to said first conductivity type, having primary conduction paths serially coupled between said borrow output terminal and a point of potential corresponding substantially to said logic zero output state, and having respective control electrodes;

means for connecting the control electrode of said first and fourth transistors to said first binary input terminal;

an inverter circuit having an input terminal connected to said second binary input terminal and an output terminal connected to the control electrodes of said second and third transistors.

* * * * *